W. H. SMITH.
Thrashing Machine.
No. 87,883. Patented March 16, 1869.
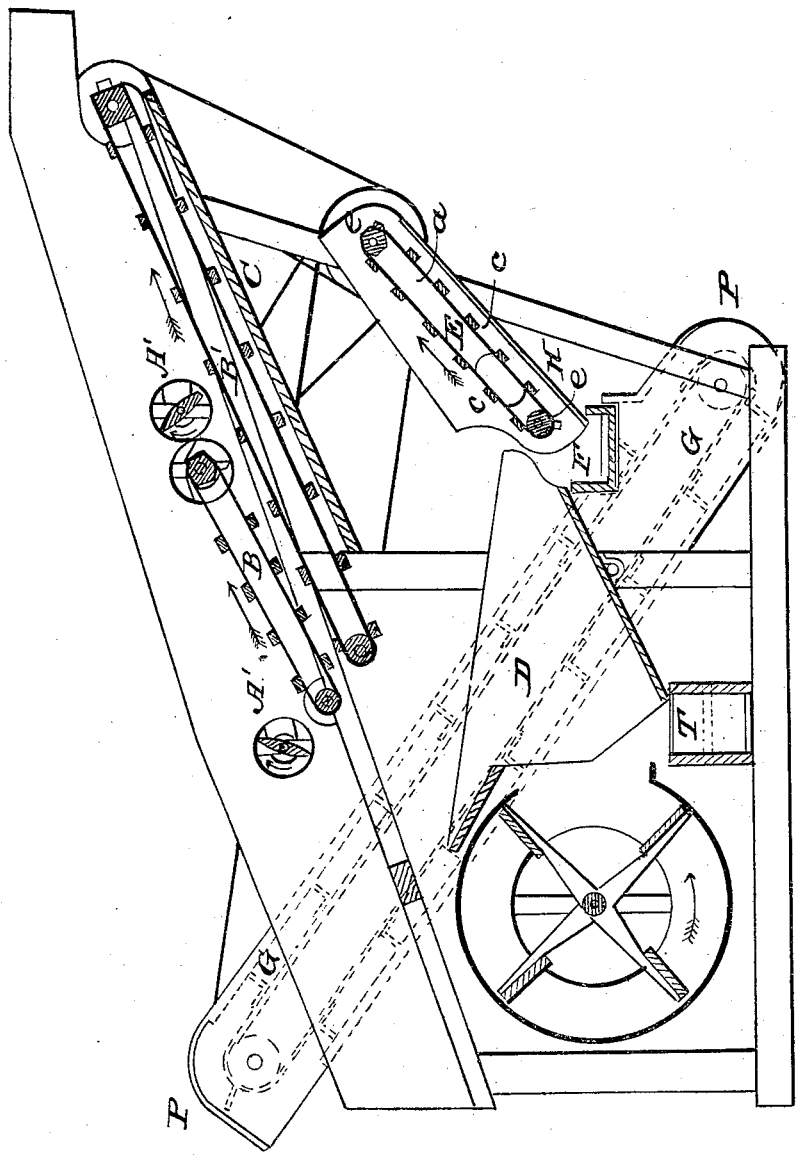

WILLIAM H. SMITH, OF LA CROSSE, WISCONSIN.

Letters Patent No. 87,883, dated March 16, 1869.

IMPROVEMENT IN THRESHING-MACHINES.

The Schedule referred to in these Letters Patent and making part of the same.

*To all whom it may concern:*

Be it known that I, WILLIAM H. SMITH, of La Crosse, in the county of La Crosse, and State of Wisconsin, have invented certain new and useful Improvements in Machines for Threshing and Cleaning Grain; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in machines for threshing and cleaning grain, and relates more especially to those parts which serve to separate the grain from the straw and chaff, after it has been threshed, as hereinafter explained.

The drawing represents a longitudinal vertical section of my improved machine, with the threshing-cylinder and table omitted.

In constructing my machine, I make a frame, and mount therein the threshing-cylinder, fan, and shoe, as usual.

The first part of my improvement consists in constructing and arranging, directly in rear of the shoe D, a frame, or chute H, in which I place a slatted apron, E, as represented in the drawing. This apron E, sometimes called a rake, or carrier, consists of two or more endless belts, *a*, passing around a couple of rollers, *e*, located at opposite ends of the chute H, and having a series of slats, *c*, secured to them transversely, as represented in the drawing.

The chute H, with its apron E, is inclined, as represented, and under its front end is located a spout, F, which passes transversely across the machine, and empties into the lower portion of a spout, P, at one side of the machine, in which spout is located an elevator, G.

With these parts thus arranged, it will be seen that any grain that may, by accident, or otherwise, be blown out of the shoe at the rear end, will be caught upon the apron E, and while the apron will carry the straw, chaff, and trash up, and deliver it over the end of the chute H, the loose grain will fall through, between the slats, upon the bottom of the chute, from whence it will slide down into the spout F, and thence into the elevator-spout P, from whence the elevator G will convey it back to the cylinder again, where the broken heads will be rethreshed, and the grain saved.

For the purpose of more thoroughly separating the threshed grain from the straw, I place in rear of the cylinder a revolving picker, or shaker A, which, as it revolves, shakes up the straw, and throws it upon a slatted apron, or carrier B, through which most of the loose grain falls, upon the sieves in the shoe below, while the straw is carried along to the rear end of the carrier B, where it is received by a second picker, A, which again shakes it up thoroughly, from whence it is thrown upon another carrier, B', as represented in the drawing. This latter carrier, B', is much longer than the first, and while its rear end extends to the rear end of the machine, to convey the straw entirely out of the machine, its front part extends down under the first carrier B, so as to catch and carry up any straws that may chance to drop, or work through the first carrier, and thus prevent their falling upon the sieves in the shoe.

Most of the grain will be separated from the straw by the time it has passed over the first carrier B, and whatever remains will be effectually separated, or shaken out by the second picker A, and will fall, through the second carrier B', upon the bottom, C, from whence it will pass down into the shoe D, where it will be winnowed and screened in the usual manner, and pass out through the delivery-spout T.

By these means, I produce a machine that most effectually separates the grain and straw in the first instance, and that catches and saves all the grain that is blown out of the shoe; and thus, by these two means, I effect a large saving of the grain over ordinary machines.

Having thus described my improvements,

What I claim, is—

1. The application, in a threshing-machine, of the slatted apron E, with a chute underneath, to receive the shelled grain, when mounted behind, and independent of the shoe, substantially as and for the purpose described.

2. The combination of the pickers A and A', and the carriers B and B', constructed and arranged to operate substantially as shown and described.

WM. H. SMITH.

Witnesses:
SETH DEAN,
O. R. JACKWITZ.